(12) United States Patent
Kojima (10) Patent No.: US 11,907,735 B2
(45) Date of Patent: Feb. 20, 2024

(54) CONTROL DEVICE AND METHOD FOR DEPLOYMENT OF SOFTWARE

(71) Applicant: OMRON Corporation, Kyoto (JP)

(72) Inventor: Tatsuya Kojima, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 284 days.

(21) Appl. No.: 17/434,637

(22) PCT Filed: Feb. 26, 2020

(86) PCT No.: PCT/JP2020/007790
§ 371 (c)(1),
(2) Date: Aug. 27, 2021

(87) PCT Pub. No.: WO2020/179581
PCT Pub. Date: Sep. 10, 2020

(65) Prior Publication Data
US 2022/0171636 A1 Jun. 2, 2022

(30) Foreign Application Priority Data
Mar. 6, 2019 (JP) ................. 2019-040601

(51) Int. Cl.
*G06F 9/445* (2018.01)
*G06F 8/71* (2018.01)

(52) U.S. Cl.
CPC ............ *G06F 9/44526* (2013.01); *G06F 8/71* (2013.01); *G06F 9/44505* (2013.01)

(58) Field of Classification Search
CPC ............ G06F 9/44505; G06F 9/44526; G06F 9/44536; G06F 8/71
(Continued)

(56) References Cited

U.S. PATENT DOCUMENTS 7,458,073 B1 * 11/2008 Darling ............... G06F 9/44521
717/172
9,965,377 B1 * 5/2018 Russell ................. G06F 11/28
(Continued)

FOREIGN PATENT DOCUMENTS

CN 103593203 A 2/2014
CN 105912346 A 8/2016
(Continued)

OTHER PUBLICATIONS

International Search Report for PCT/JP2020/007790 dated Apr. 28, 2020 [PCT/ISA/210].
(Continued)

*Primary Examiner* — Glenford J Madamba
(74) *Attorney, Agent, or Firm* — Sughrue Mion, PLLC (57) ABSTRACT

A control device includes a main storage device that stores a user program and program packages in a nonvolatile manner; a main memory having a package management module arranged therein; and a processor. The package management module performs a deployment process for selecting, from the program packages, a package to be deployed based on a version of the user program, and arranging, from the package to be deployed, a version of a program compatible with the version of the user program in the main memory.

6 Claims, 8 Drawing Sheets

(58) Field of Classification Search
USPC .......................................................... 709/202
See application file for complete search history.

(56) References Cited

U.S. PATENT DOCUMENTS

| | | | |
|---|---|---|---|
| 2014/0298310 A1 | 10/2014 | Iijima | |
| 2015/0074657 A1* | 3/2015 | Bhat | ........................ G06F 8/65 717/170 |
| 2018/0219972 A1* | 8/2018 | Vintzel | ..................... G06F 8/61 |
| 2018/0341475 A1* | 11/2018 | Bocaletti | ................. H04L 67/34 |

FOREIGN PATENT DOCUMENTS

| | | |
|---|---|---|
| CN | 107809445 A | 3/2018 |
| CN | 107864098 A | 3/2018 |
| JP | 07-253875 A | 10/1995 |
| JP | 11-161479 A | 6/1999 |
| JP | 11-224999 A | 8/1999 |
| JP | 2005-038063 A | 2/2005 |
| JP | 2007-4273 A | 1/2007 |
| JP | 2016-224559 A | 12/2016 |

OTHER PUBLICATIONS

Written Opinion for PCT/JP2020/007790 dated Apr. 28, 2020 [PCT/ISA/237].
Decision to Grant a Patent dated Feb. 1, 2022 from the Japanese Patent Office in JP Application No. 2019-040601.
Extended European Search Report dated Oct. 13, 2022 from the European Patent Office in EP Application No. 20766476.4.
Notice of Allowance dated Nov. 14, 2023 in Chinese Application No. 202080017947.7.
He Guofeng, et al., "Firmware online upgrade implementation for wearable devices based on simulating BIOS", Embedded Technology, 2017, vol. 43, No. 3, 63-65 and 69 (4 pages).
Binhao Fang, "Firmware Upgrade Design of ARM Processor Based on IAP", Modern Information Technology, Aug. 2018, vol. 2, No. 8, 50-51 (2 pages).

* cited by examiner

| MODEL | PACKAGE A PROGRAM | PACKAGE B PROGRAM | ... |
|---|---|---|---|
| CPU-101 | VERSION 1.1 OR LATER | VERSION 1.0 OR LATER | ... |
| CPU-102 | ... | ... | ... |
| ... | ... | ... | ... |

FIG.6

| USER DATA VERSION | PACKAGE A PROGRAM | PACKAGE B PROGRAM | PACKAGE C PROGRAM |
|---|---|---|---|
| 1.0 | VERSION 1.01 | VERSION 1.01 | VERSION 1.02 |
| ... | ... | ... | ... |

CONTROL DEVICE AND METHOD FOR DEPLOYMENT OF SOFTWARE

CROSS REFERENCE TO RELATED APPLICATIONS

This application is a National Stage of International Application No. PCT/JP2020/007790 filed Feb. 26, 2020, claiming priority based on Japanese Patent Application No. 2019-040601 filed Mar. 6, 2019, the entire contents of each of which being herein incorporated by reference in their entireties.

TECHNICAL FIELD

The present disclosure relates to a control device that controls an object to be controlled, and a method for deployment of software in the control device.

BACKGROUND ART

Control devices such as programmable logic controllers (PLCs) have been introduced into various manufacturing sites. Such a control device is a type of computer that executes a user program such as a control program designed in accordance with a manufacturing apparatus or a manufacturing facility. This type of programmable controller stores a user program created by a program tool, and controls a process by interpreting and executing this user program.

The program tool and the programmable controller may each manage a program, causing a version mismatch to occur between the programs of the tool and the controller. Japanese Patent Laying-Open No. 7-253875 (PTL 1) discloses a program-execution-preventing means for preventing, when a tool version and an interpreter version do not match, execution of a corresponding user program.

CITATION LIST

Patent Literature

PTL 1: Japanese Patent Laying-Open No. 7-253875

SUMMARY OF INVENTION

Technical Problem

A plurality of programs that are invoked during execution of a user program are often stored in a programmable controller in advance. Various versions of programs could be stored in the programmable controller, so as to be able to support various versions of user programs. In order to execute a user program, therefore, the programmable controller needs to select an appropriate version of a package program corresponding to a version of the user program.

One object of the present disclosure is to provide a control device capable of selecting, in accordance with a version of a user program, an appropriate version of a package program from among a plurality of versions, and a method for deployment of software in the control device.

Solution to Problem

An example of the present disclosure is a control device for controlling an object to be controlled, the control device including: a main storage device configured to store a user program and one or more program packages in a nonvolatile manner, the one or more program packages each storing one or more versions of programs that are executed in cooperation with the user program; a main memory configured to arrange the user program and the programs of the program packages; and a processor configured to execute software including a package management module that manages the program packages, in which the package management module is configured to perform a deployment process for selecting, from the one or more program packages, a package to be deployed based on a version of the user program, and arranging, from the package to be deployed, a version of a program compatible with the version of the user program in the main memory.

According to the above, the control device can select, in accordance with the version of the user program, an appropriate version of a package program from among the plurality of versions. Accordingly, backward compatibility of the user program can be ensured, for example.

Preferably, the one or more program packages each include a check module configured to select, from the package to be deployed, the version of the program compatible with the version of the user program, and to arrange the selected program in the main memory, in accordance with the deployment process by the package management module.

According to the above, the package management module only needs to select a required package. The check module, on the other hand, only needs to select an appropriate version of a program. Thus, the addition of a package can be flexibly handled.

Preferably, the main storage device is configured to store model information about a model name of hardware of the control device, and the package management module is configured to acquire the model information from the main storage device, and to select, from the one or more program packages, the package to be deployed based on the model information and the version of the user program.

According to the above, based on the model information, a package including a program that cooperates with the user program can be selected.

Preferably, the main storage device is configured to store a package management table, the package management table storing the model information, and a version of a program associated with the model information in each of the one or more program packages, and the check module is configured to acquire, based on the model information and information stored in the package management table, information about a version of a program of the package compatible with the version of the user program.

According to the above, based on the model information and the version of the user program, a program compatible with the user program can be selected from the package.

Preferably, the one or more program packages are a plurality of program packages, the plurality of program packages include an add-on package added on to the control device, the main storage device is configured to store a table, the table storing the version of the user program and a version of each program of each of the plurality of program packages in association with each other, and the package management module is configured to determine, based on information stored in the table, whether or not a combination of the plurality of program packages including the add-on package is a combination compatible with the version of the user program, and when the combination of the plurality of program packages is the combination compatible with the version of the user program, to select a program of the add-on package having a version compatible with the version of the user program.

According to the above, a program of the add-on package can be appropriately deployed.

An example of the present disclosure is a method for deployment of software for use in a control device that controls an object to be controlled, the control device including a main storage device configured to store a user program and one or more program packages in a nonvolatile manner, the one or more program packages each storing one or more versions of programs that are executed in cooperation with the user program, a main memory configured to arrange the user program and the programs of the program packages, and a processor configured to execute the software, the method for deployment including: acquiring a version of the user program; selecting, from the one or more program packages, a package to be deployed based on the version of the user program; selecting, from the package to be deployed, a version of a program compatible with the version of the user program; and arranging the selected program in the main memory.

According to the above, in accordance with the version of the user program, an appropriate version of a package program can be selected from among the plurality of versions. Accordingly, backward compatibility of the user program can be ensured, for example.

Preferably, the selecting the package to be deployed includes acquiring model information about a model name of hardware of the control device, the model information stored in the main storage device, and selecting, from the one or more program packages, the package to be deployed based on the model information and the version of the user program.

According to the above, based on the model information, a package including a program that cooperates with the user program can be selected.

Preferably, the main storage device is configured to store a package management table, the package management table storing the model information, and a version of a program associated with the model information in each of the one or more program packages, and the selecting the version of the program compatible with the version of the user program includes acquiring version information based on the model information.

According to the above, based on the model information and the version of the user program, a program compatible with the user program can be selected from the package.

Preferably, the one or more program packages are a plurality of program packages, the plurality of program packages include an add-on package added on to the control device, the main storage device is configured to store a table, the table storing the version of the user program and a version of each program of each of the plurality of program packages in association with each other, and the selecting, from the package to be deployed, the version of the program compatible with the version of the user program includes determining, based on information stored in the table, whether or not a combination of the plurality of program packages including the add-on package is a combination compatible with the version of the user program, and when the combination of the plurality of program packages is the combination compatible with the version of the user program, selecting a program of the add-on package having a version compatible with the version of the user program.

According to the above, a program of the add-on package can be appropriately deployed.

Advantageous Effects of Invention

According to the present disclosure, the control device can select, in accordance with the version of the user program, an appropriate version of a package program from among the plurality of versions.

DESCRIPTION OF EMBODIMENTS

Each present embodiment according to the present invention will be described below with reference to the drawings. In the description below, the same elements and components have the same reference characters allotted and their labels and functions are also the same. Therefore, detailed description thereof will not be repeated. Each present embodiment and each modification described below may selectively be combined as appropriate.

A. Application

An exemplary scene where the present invention is applied will initially be described with reference to FIGS. 1 and 2.

Figure 1:
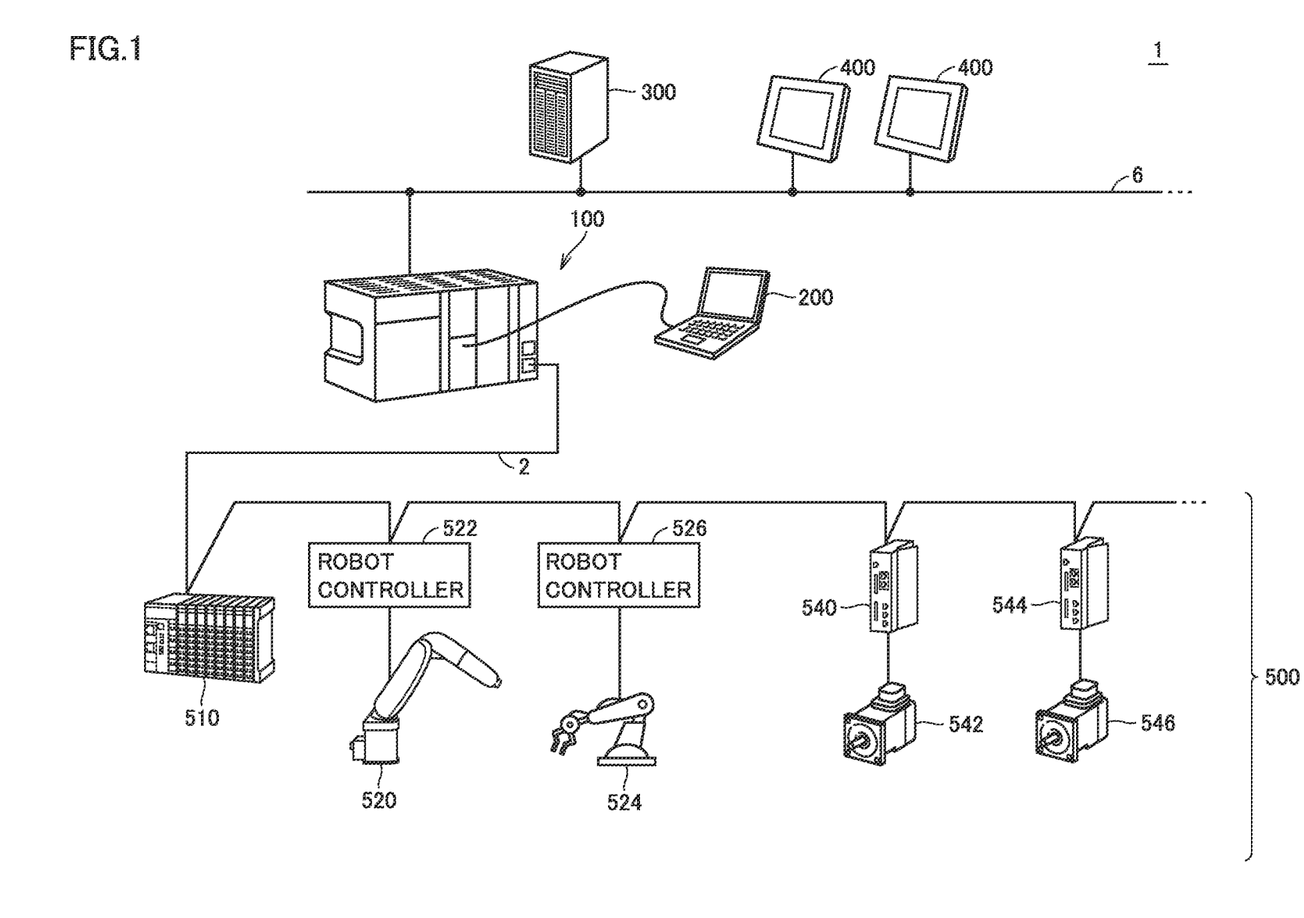
FIG. 1 is a diagram schematically showing an exemplary overall configuration of a control system according to the present embodiment.

FIG. 1 is a diagram schematically showing an exemplary overall configuration of a control system 1 according to the present embodiment. FIG. 1 shows control system 1 centered around a control device 100 according to the present embodiment.

Referring to FIG. 1, control device 100 corresponds to an industrial controller that controls an object to be controlled such as various facilities and apparatuses. Control device 100 is a type of a computer that performs control operations as will be described later, and it may typically be implemented by a programmable controller (PLC).

Control device 100 may be connected to various field devices 500 through a field network 2. Control device 100 exchanges data with one or more field devices 500 through, for example, field network 2. A "field network," while also referred to commonly as a "field bus," will be collectively referred to as a "field network" in the following description for simplicity of the description. That is, a "field network" as used herein is a concept that may include a "field bus," in addition to a "field network" in a narrow sense.

Any field device 500 can be connected to field network 2. Field devices 500 include, for example, an actuator that provides any physical action to a manufacturing apparatus, a production line and the like (hereinafter also collectively referred to as a "field"), and an input/output device that exchanges information with the field. For example, EtherCAT® can be employed as field network 2.

In the example shown in FIG. 1, field devices 500 connected to field network 2 include a remote input/output (I/O) device 510, robot controllers 522, 526, and servo drivers 540, 544. Robot controllers 522, 526 and servo drivers 540, 544 correspond to one or more actuators (devices) that operate in accordance with a control command from control device 100.

While FIG. 1 shows an example where the one or more actuators that operate in accordance with a control command from control device 100 are also connected to field network 2, this is not limiting. The actuators may be connected in any form so long as they can receive the control command from control device 100. For example, the control command may be provided, through a signal line, from remote I/O device 510 connected to field network 2.

Figure 2:
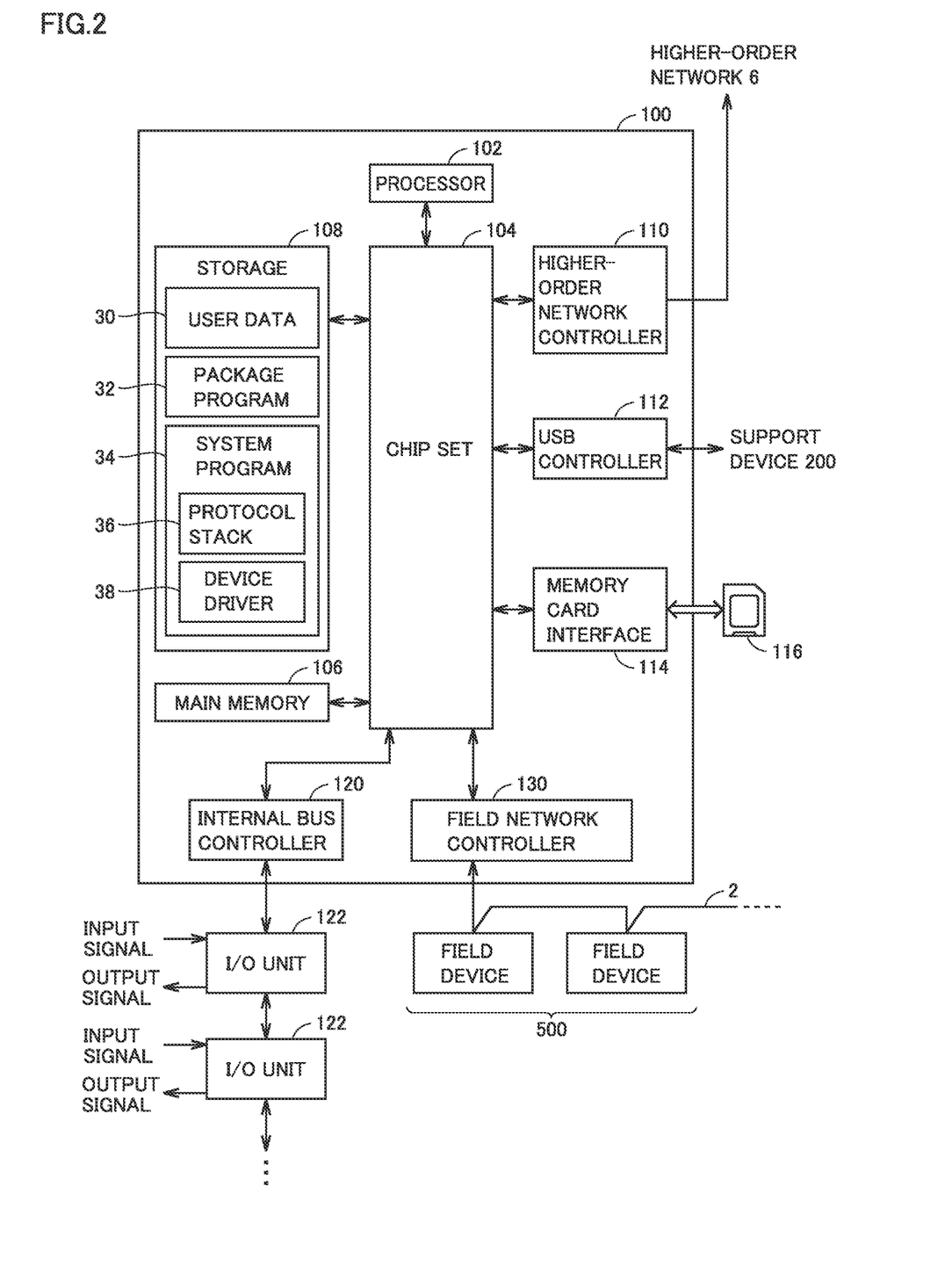
FIG. 2 is a block diagram showing an exemplary hardware configuration of a control device according to the present embodiment.

FIG. 2 is a block diagram showing an exemplary hardware configuration of control device 100 according to the present embodiment. Referring to FIG. 2, control device 100 according to the present embodiment is an operation processing unit also referred to as a CPU unit, which includes a processor 102 and a field network controller 130.

Field network controller 130 controls exchange of data with field device 500 through field network 2. Such data exchange includes a process of transmitting data such as a control command from control device 100 to field device 500 (hereinafter also referred to as "output data"), and a process of receiving, by control device 100, data collected or generated at field device 500 (hereinafter also referred to as "input data"). Field network controller 130 corresponds to an example of "communication circuit".

Control device 100 is configured to control field device 500 by sequentially repeating, in a predetermined control cycle, transmission of the output data, reception of the input data, and execution of a control program for generating the output data using the input data.

The control program includes a user program created in accordance with a control purpose at the user, and at least one program that cooperates with the user program to achieve the control purpose at the user. The latter program may include a system program, for example In the present embodiment, control device 100 stores at least one package, and the package includes one or more versions of programs.

Control device 100 selects a required package in accordance with, for example, a version of the user program, and provides to each package a deployment instruction including version information about the user program. Each package loads an appropriate version of a program in accordance with the version information. In control device 100, therefore, an appropriate version of a package program can be selected from among a plurality of versions in accordance with the version of the user program. In control device 100, the addition (add-on) of a package can also be flexibly handled.

A more detailed configuration and processing of control system 1 according to the present embodiment will be described below as a more specific application of the present invention.

B. Exemplary Overall Configuration of Control System

An exemplary overall configuration of control system 1 shown in FIG. 1 will initially be described in more detail.

In the exemplary configuration shown in FIG. 1, servo drivers 540, 544 drive servomotors 542, 546, respectively, in accordance with a control command (for example, a position command or a velocity command) from control device 100.

Robot controller 522 drives a robot 520, and robot controller 526 drives a robot 524. Robot controllers 522, 526 perform, for example, a trajectory calculation and an angle calculation for each axis in accordance with a control command (such as a position command or a velocity command) from control device 100, and drive, for example, servomotors constituting robots 520, 524 in accordance with results of the calculations.

Remote I/O device 510 typically includes a communication coupler that conducts communication through field network 2, and an input/output unit (hereinafter also referred to as an "I/O unit") for acquiring input data and outputting output data. Remote I/O device 510 is connected to devices that collect input data, such as an input relay and various sensors (for example, an analog sensor, a temperature sensor, and a vibration sensor), and devices that provide any action to the field, such as an output relay, a contactor, a servo driver, and any other actuator.

Field device 500 is not limited to them, and any device that collects input data (for example, a visual sensor), and any device that provides any action in accordance with output data (for example, an inverter device) can be employed.

Control device 100 may be connected to other devices through a higher-order network 6. A common network protocol such as Ethernet® or EtherNet/IP® may be employed for higher-order network 6. More specifically, one or more server devices 300 or one or more display devices 400 may be connected to higher-order network 6.

Server device 300 may be a database system, a manufacturing execution system (MES), or the like. The manufacturing execution system acquires information from a manufacturing apparatus or a facility to be controlled, and monitors and manages the entire production. The manufacturing execution system can also handle order information, quality information, shipment information, and the like. This is not limiting, and a device that provides information-related service may be connected to higher-order network 6. The information-related service may be a process of acquiring information from a manufacturing apparatus or a facility to be controlled, and conducting a macroscopic or microscopic analysis. For example, the information-related service may be data mining for extracting any characteristic tendency included in information from a manufacturing apparatus or a facility to be controlled, or a machine learning tool for performing machine learning based on information from a facility or a machine to be controlled.

Display device 400 receives a manipulation from a user and outputs, for example, a command in accordance with the user's manipulation to control device 100, and also graphically displays, for example, a result of operation performed at control device 100.

Further, a support device 200 is connectable to control device 100. Support device 200 is a device that supports preparation required for control device 100 to control an object to be controlled. Specifically, support device 200 provides, for example: a development environment for a program to be executed on control device 100 (such as a tool for creating and editing a program, a parser, a compiler); a setting environment for setting parameters (configurations) of control device 100 and various devices connected to control device 100; a function of outputting a created sequence program to control device 100; and a function of correcting and modifying, online, the sequence program to be executed on control device 100.

While control device 100, support device 200 and display device 400 are configured separately from one another in control system 1 shown in FIG. 1, a configuration may be employed in which all or some of their functions are integrated into a single device.

C. Exemplary Hardware Configuration of Control Device

FIG. 2 is a block diagram showing an exemplary hardware configuration of control device 100 according to the present embodiment.

Referring to FIG. 2, control device 100 is an operation processing unit referred to as a CPU unit, which includes processor 102, a chip set 104, a main memory 106, a storage 108, a higher-order network controller 110, a universal serial bus (USB) controller 112, a memory card interface 114, an internal bus controller 120, and field network controller 130.

Processor 102 is configured as, for example, a central processing unit (CPU), a micro processing unit (MPU), or a graphics processing unit (GPU). As processor 102, a configuration having a plurality of cores may be employed or a plurality of processors 102 may be disposed. That is, control device 100 includes one or more processors 102, and/or processor 102 having one or more cores. Chip set 104 controls processor 102 and peripheral elements to thereby implement the entire processing of control device 100.

Main memory 106 is configured as a volatile storage device such as a dynamic random access memory (DRAM) and a static random access memory (SRAM). Storage 108 is a main storage device, and is configured as a nonvolatile storage device such as a hard disk drive (HDD) and a solid state drive (SSD).

Processor 102 reads various programs stored in storage 108, develops the programs in main memory 106 and executes the programs, to thereby implement control for an object to be controlled as well as various processes. Storage 108 stores, in addition to user data 30, one or more package programs 32 and setting information 40.

User data 30 is created at support device 200 in accordance with a control purpose at the user, and sent from support device 200 to control device 100. User data 30 includes a user program designed in accordance with, for example, a line (process) to be controlled by control system 1. The user program cooperates with package program 32 to achieve the control purpose at the user. That is, the user program implements a programmed operation by using an instruction, a function, a functional module and the like provided by package program 32. Thus, the user program and the package program may be collectively referred to as a "control program." Package program 32 is prepared in accordance with a manufacturing apparatus or facility to be controlled, for example, and stored in storage 108.

A system program 34 can include a protocol stack 36 and a device driver 38. System program 34 is a program for implementing the functions of control device 100. For example, system program 34 can include a scheduler program, an input/output process program, and other system programs. Protocol stack 36 is implemented by a hierarchy of a plurality of protocols that define a procedure and exchange of communication in field network 2. Device driver 38 is a driver for controlling field network controller 130.

Higher-order network controller 110 controls exchange of data with server device 300, display device 400 (see FIG. 1) and the like, through higher-order network 6. USB controller 112 controls exchange of data with support device 200 through USB connection.

Memory card interface 114 is configured such that a memory card 116 can be inserted therein and removed therefrom, and can write data to memory card 116 and read various types of data (a sequence program, a user program and the like) from memory card 116.

Internal bus controller 120 controls exchange of data with an I/O unit 122 attached to control device 100. Specifically, internal bus controller 120 functions as a transmission buffer for data to be output to I/O unit 122 (output data), and as a reception buffer for data to be input from I/O unit 122 (input data). The output data generated from operation processing by processor 102 is primarily stored in storage 108. The output data to be transferred to a particular I/O unit 122 is then read from storage 108 and temporarily held in the transmission buffer. The input data transferred from I/O unit 122 is temporarily held in the reception buffer, and is then transferred to storage 108. Internal bus controller 120 further performs a process of transmitting the output data in the transmission buffer to I/O unit 122, and a process of receiving the input data from I/O unit 122 and storing it in the reception buffer. Typically, internal bus controller 120 provides functions of a physical layer and a data link layer in an internal bus.

Field network controller 130 controls exchange of data with field device 500 through field network 2. That is, field network controller 130 controls transmission of output data and reception of input data in accordance with the standards of field network 2. Specifically, field network controller 130 functions as a transmission buffer for data to be output to field device 500 (output data), and as a reception buffer for data to be input from field device 500 (input data). The output data generated from operation processing by processor 102 is primarily stored in storage 108. The output data to be transferred to a particular field device 500 is then read from storage 108 and temporarily held in the transmission buffer. The input data transferred from field device 500 is temporarily held in the reception buffer, and is then transferred to storage 108. Field network controller 130 further performs a process of transmitting the output data in the transmission buffer to field device 500, and a process of receiving the input data from field device 500 and storing it in the reception buffer. Typically, field network controller 130 provides functions of a physical layer and a data link layer in field network 2.

While FIG. 2 shows an exemplary configuration where processor 102 executes a program to provide specific required functions, some or all of these functions to be provided may be implemented using a dedicated hardware circuit (for example, an ASIC or an FPGA). Alternatively, the principal part of control device 100 may be implemented using hardware in accordance with a general-purpose architecture (for example, an industrial personal computer based on a general-purpose personal computer). In this case, a virtualization technology may be used to execute in parallel a plurality of operating systems (OSs) for different uses, and to execute a required application on each OS.

D. Exemplary Configuration of Support Device

Figure 3:
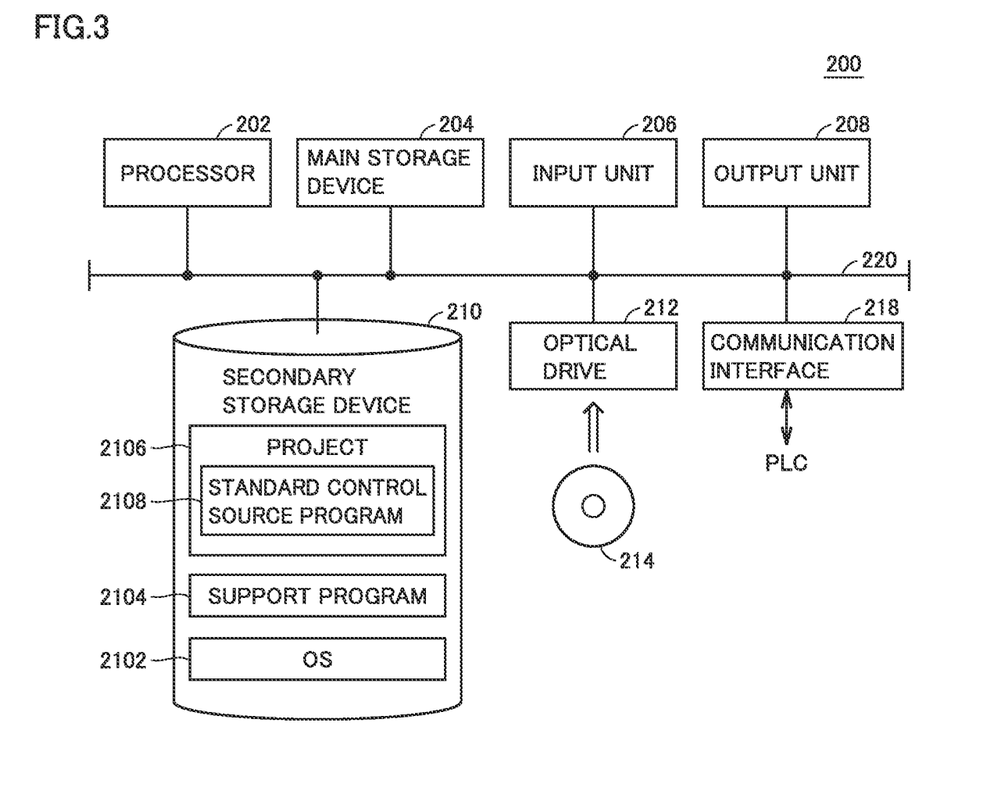
FIG. 3 is a schematic diagram showing an exemplary hardware configuration of a support device connected to the control device according to the present embodiment.

FIG. 3 is a schematic diagram showing an exemplary hardware configuration of support device 200 connected to control device 100 according to the present embodiment. Support device 200 is implemented, by way of example, using hardware in accordance with a general-purpose architecture (for example, a general-purpose personal computer).

Referring to FIG. 3, support device 200 includes a processor 202 such as a CPU or a GPU, a main storage device 204, an input unit 206, an output unit 208, a secondary storage device 210, an optical drive 212, and a communication interface 218. These components are connected through a processor bus 220.

Processor 202 reads programs (by way of example, an OS 2102 and a support program 2104) stored in secondary storage device 210, develops the programs in main storage device 204 and executes the programs, to thereby implement various processes.

Secondary storage device 210 stores, in addition to OS 2102 for implementing basic functions, support program 2104 for providing the functions of support device 200. Support program 2104 is executed by an information processing device (practically, processor 202) which is a computer, to thereby implement support device 200 according to the present embodiment.

Secondary storage device 210 stores a project 2106, which is created by a user in a development environment provided by the execution of support program 2104.

In the present embodiment, support device 200 provides a development environment in which the setting of each device included in control device 100 (denoted as "PLC" in FIG. 3) and the creation of a program to be executed in each device can be performed in an integrated manner. Project 2106 includes data generated in such an integrated development environment.

Typically, project 2106 includes a standard control source program 2108. Standard control source program 2108 is converted to an object code, and then transferred to control device 100 and stored as a user program.

Input unit 206 is configured as a keyboard and/or a mouse, for example, to receive a user's manipulation. Output unit 208 is configured as a display, various indicators, and/or a printer, for example, to output results of processes, for example, from processor 202.

Communication interface 218 exchanges data with control system 1 through any communication medium such as a USB or Ethernet.

Support device 200 includes optical drive 212 that reads, from a recording medium 214 (for example, an optical recording medium such as a digital versatile disc (DVD)) storing a computer-readable instruction in a non-transitory manner, and installs the read program in secondary storage device 210, for example.

Support program 2104 to be executed in support device 200, for example, may be installed through computer-readable recording medium 214, or may be installed by being downloaded from a server device on a network, for example. Functions provided by support device 200 according to the present embodiment may also be implemented by means of a part of a module(s) provided by the OS.

While FIG. 3 shows an exemplary configuration where processor 202 executes a program to provide specific required functions of support device 200, some or all of these functions to be provided may be implemented using a dedicated hardware circuit (for example, an ASIC or an FPGA).

E. Exemplary Scene where Control Device is Applied

Figure 4:
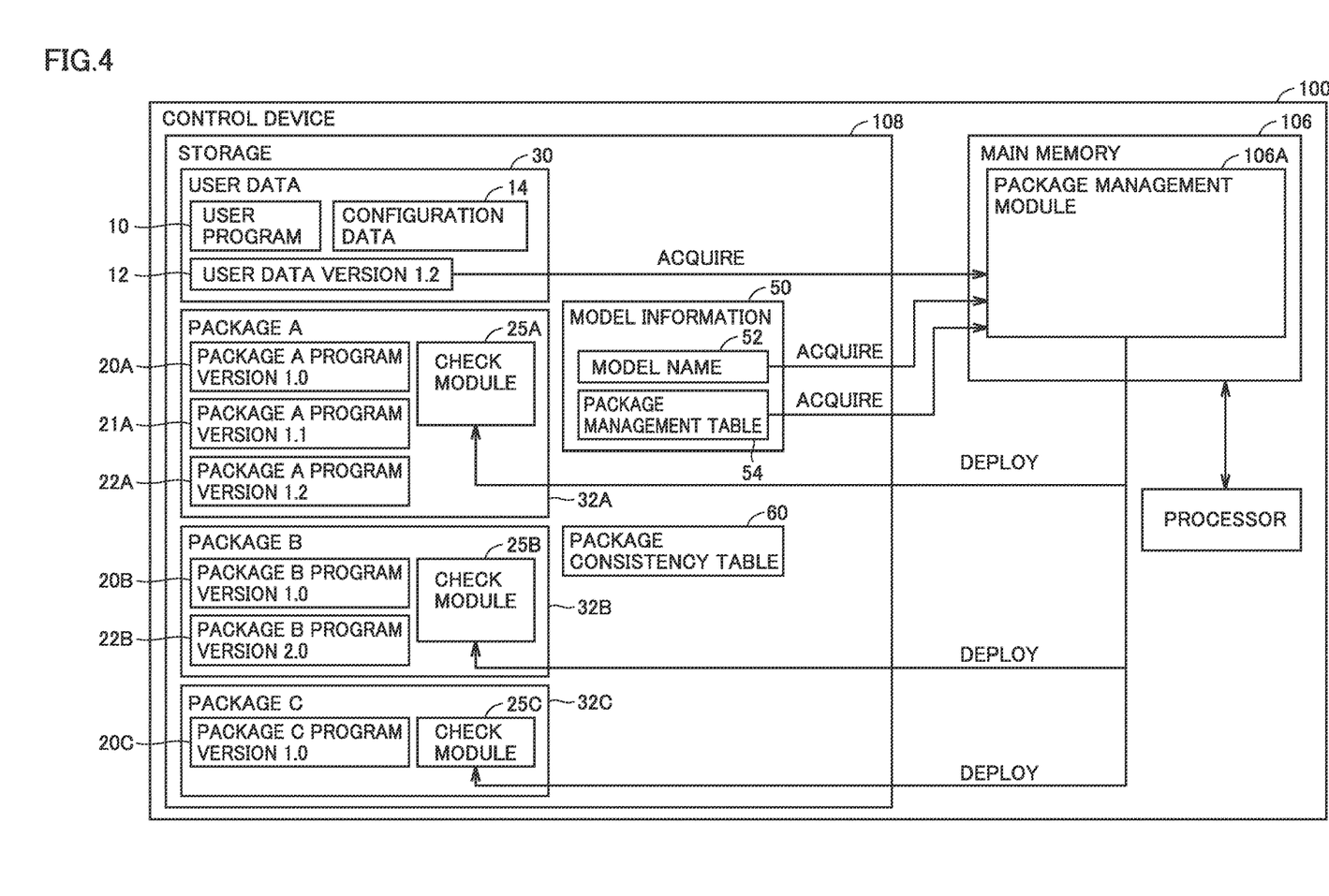
FIG. 4 is a diagram showing an exemplary scene where the control device according to the present embodiment is applied.

FIG. 4 is a diagram showing an exemplary scene where control device 100 according to the present embodiment is applied. The configuration shown in FIG. 4 is implemented by development of a program in main memory 106.

Storage 108 serving as a main storage device stores user data 30, packages 32A, 32B, 32C, model information 50, and a package consistency table 6. Packages 32A, 32B, 32C are also denoted as "package A," "package B," "package C," respectively, in FIG. 4. A package management module 106A is arranged in main memory 106 by development of a program in main memory 106.

User data 30 is created at support device 200, and transferred from support device 200 to control device 100. User data 30 includes a user program 10, user data version information 12, and configuration data 14.

User program 10 implements an intended operation by using an instruction, a function, a functional module and the like provided by one or more of packages 32A to 32C. A version of user program 10 is indicated by user data version information 12. In the example of FIG. 3, the version of the user data is "1.2." User data 30 may include, in addition to the information about the user data version, information about an attribute of the user data.

Configuration data 14 includes information that defines the configuration and settings of control system 1 including control device 100. For example, configuration data 14 can include information about a user program and a set value associated with field device 500 connected to field network 2, and information about a user program and a set value associated with a device connected to higher-order network 6.

Control device 100 stores programs on a package-by-package basis. For example, packages 32A, 32B, 32C may be related to a communication protocol such as E-CAT. The packages may be preinstalled in control device 100, or may be installed in control device 100 as an add-on.

Packages 32A, 32B, 32C each include one or more versions of programs (package programs) and a check module. Package 32A includes a version 1.0 of a program 20A, a version 1.1 of a program 21A, a version 1.2 of a program 22A, and a check module 25A.

Package 32B includes a version 1.0 of a program 20B, a version 2.0 of a program 22B, and a check module 25B.

Package 32C includes a version 1.0 of a program 20C, and a check module 25C.

During deployment which will be described later, the check module of each package checks the versions of the one or more programs included in the package, and selects an appropriate version of a program. The appropriate version is, for example, a version that allows the user program to be backward compatible with the program of the package program. It may also be a version that allows the user program to be upward compatible with the program of the package program.

Model information 50 includes model name information 52 and a package management table 54. Model name information 52 includes information about a model name of hardware, for example, a model of processor 102 shown in FIG. 2. Model name information 52 may include information about a model name of another hardware. For example, model name information 52 may include model information about field network controller 130.

Figure 5:
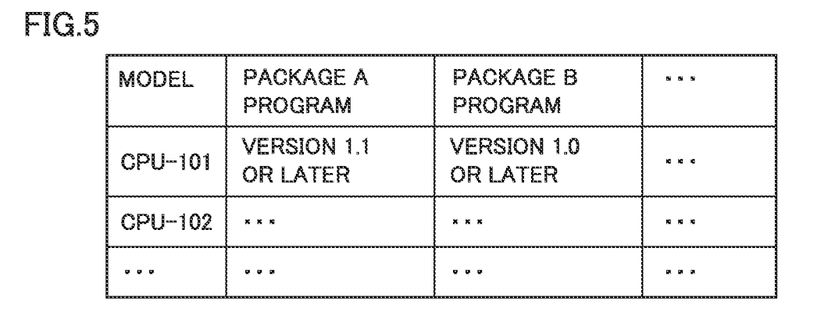
FIG. 5 is a schematic diagram showing an exemplary package management table.

Package management table 54 stores the model name included in model name information 52, and a corresponding program version of each package program, in association with each other. FIG. 5 is a schematic diagram showing an exemplary package management table 54. Package management table 54 stores the model of processor 102. The model of processor 102 and a compatible version of each package program (denoted as "package A program," "package B program" and the like in FIG. 5) are associated with each other. When the model of processor 102 is "CPU 101," for example, a compatible program version of the package A program is 1.1 or later, and a compatible program version of the package B program is 1.0 or later.

Figure 6:
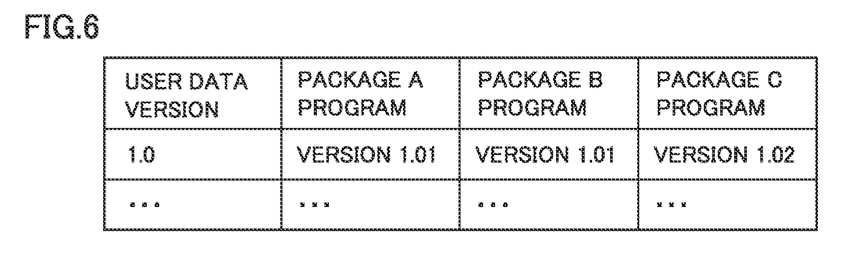
FIG. 6 is a schematic diagram showing an exemplary package consistency table 60.

Package consistency table 60 stores a user data version and a version of each package program in association with each other. FIG. 6 is a schematic diagram showing an exemplary package consistency table 60. As shown in FIG. 6, for one user data version, the version of each package program is registered. Package consistency table 60 represents a combination of versions of package programs that cannot be used for a certain user data version. When the user data version is 1.0, for example, a combination of the package A program (version 1.01), the package B program (version 1.01) and the package C program (version 1.02) cannot be used.

A program to be executed by processor 102 is developed in main memory 106. Package management module 106A is one of modules of programs developed in main memory 106. Data, information and the like acquired by the execution of the program by processor 102 are temporarily stored in main memory 106. In FIG. 4, arrows from storage 108 toward package management module 106A indicate that information acquired from storage 108 is stored in main memory 106. Arrows from package management module 106A toward storage 108, on the other hand, indicate control by package management module 106A.

Package management module 106A acquires model information 50 from storage 108, and selects a package program to be deployed from each of packages 32A, 32B, 32C. Package management module 106A acquires a version of the user data from storage 108, and deploys the selected package program based on the user data version. As a result, a version of a package program compatible with the user data version is developed in main memory 106.

F. Deployment Process

In an example described below, it is assumed that packages 32A, 32B are preinstalled in control device 100, and package 32C is a package program added on to control device 100.

Figure 7:
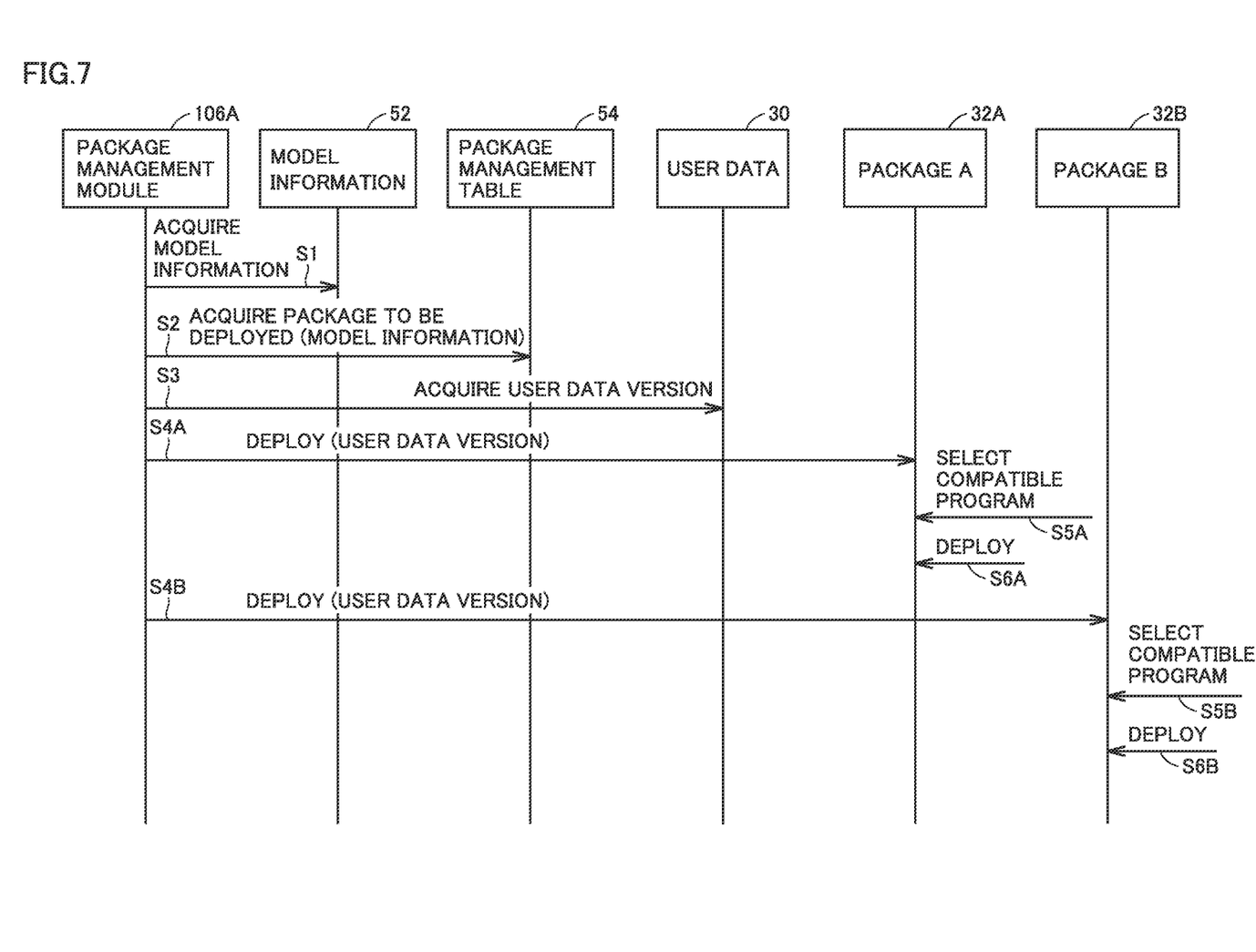
FIG. 7 is a diagram illustrating a deployment process based on fixed model information in the control device according to the present embodiment.

FIG. 7 is a diagram illustrating a deployment process based on fixed model information in the control device according to the present embodiment. FIG. 7 shows a flow of deployment based on information included in model information 50 in advance. In step S1, package management module 106A acquires model information (for example, model information about processor 102) by referring to model information 50.

Then, in step S2, package management module 106A refers to package management table 54. Based on the model information acquired in step S1, package management module 106A acquires a package to be deployed, and information about an appropriate version of a program of the package (model information).

Then, in step S3, package management module 106A refers to user data 30. Specifically, package management module 106A acquires a user data version by referring to user data version information 12.

In step S4A, package management module 106A performs deployment of package 32A in accordance with the user data version. In this case, package management module 106A provides a deployment instruction to check module 25A of package 32A. In package 32A, check module 25A selects a compatible package program (step S5A), and deploys the program (step S6A).

Likewise, in step S4B, package management module 106A deploys package 32B in accordance with the user data version. Package management module 106A provides a deployment instruction to check module 25B of package 32B. In package 32B, check module 25B selects a compatible package program (step S5B), and deploys the program (step S6B).

While the process of step S4B has been described following the description of the process of step S4A for the purpose of illustration, the processes of steps S4A, S4B may be performed sequentially or in parallel. Package consistency table 60 may be referred to in the processes of steps S4A, S4B.

Figure 8:
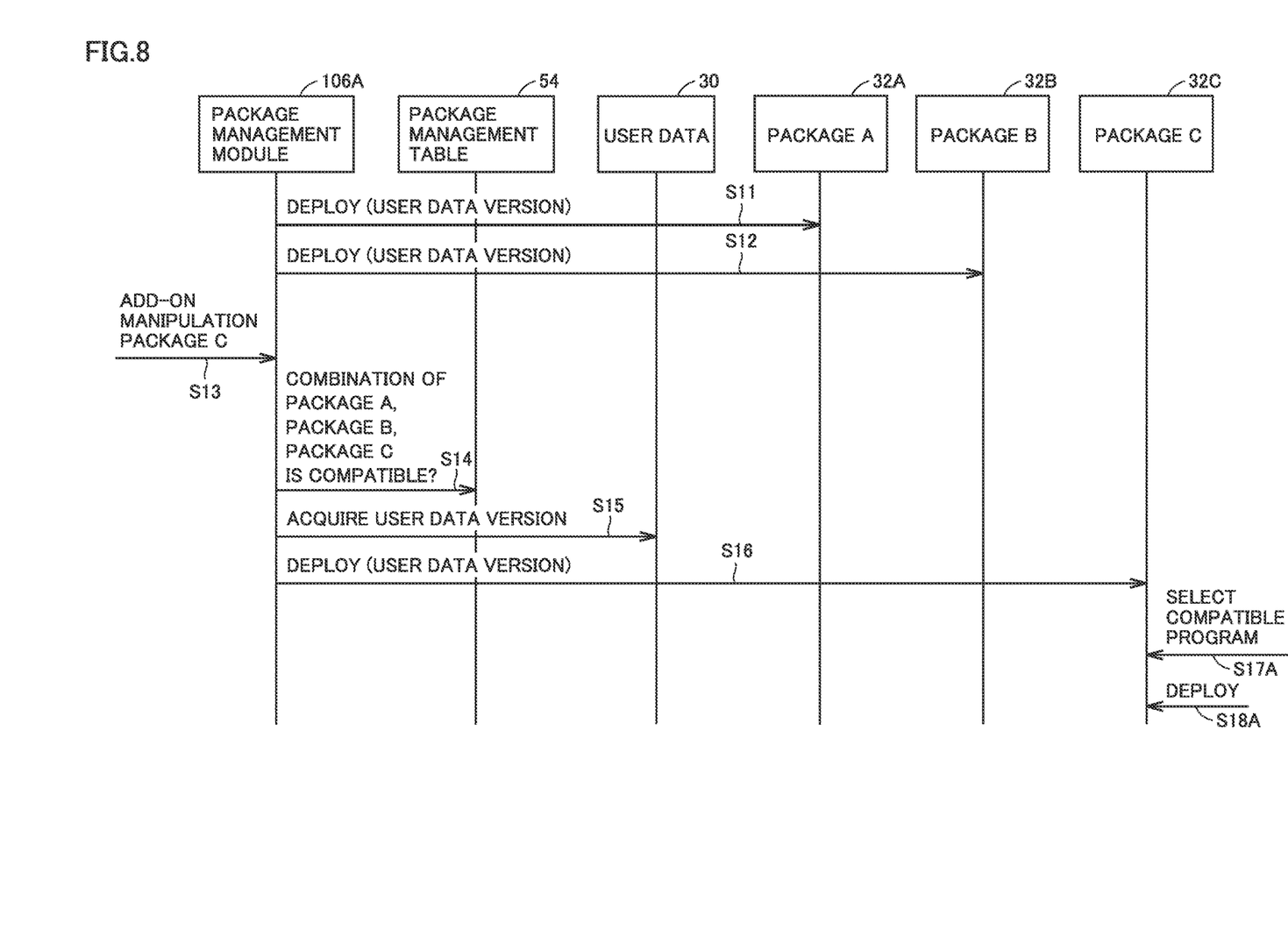
FIG. 8 is a diagram illustrating a process for deployment of an add-on package in the control device according to the present embodiment.

FIG. 8 is a diagram illustrating a process for deployment of an add-on package in the control device according to the present embodiment. Referring to FIG. 8, in step S11, package management module 106A performs deployment of package 32A in accordance with the user data version. In step S12, package management module 106A performs deployment of package 32B in accordance with the user data version. The processes of steps S11, S12 are basically the same as the processes of the corresponding steps shown in FIG. 7, and a subsequent description of them will therefore not be repeated.

In step S13, package management module 106A receives a manipulation for an add-on of package 32C from outside. In this case, package management module 106A determines, by referring to package consistency table 60, whether or not there is a combination of compatible versions among the combinations of programs of packages 32A, 32B, 32C.

When there is a combination of compatible versions, in step S15, package management module 106A acquires a user data version by referring to user data version information 12. In step S16, package management module 106A instructs check module 25C to deploy a compatible version of a program in package 32C in accordance with the user data version. In package 32C, check module 25C selects a compatible package program (step S17A), and deploys the package program (step S18A).

Figure 9:
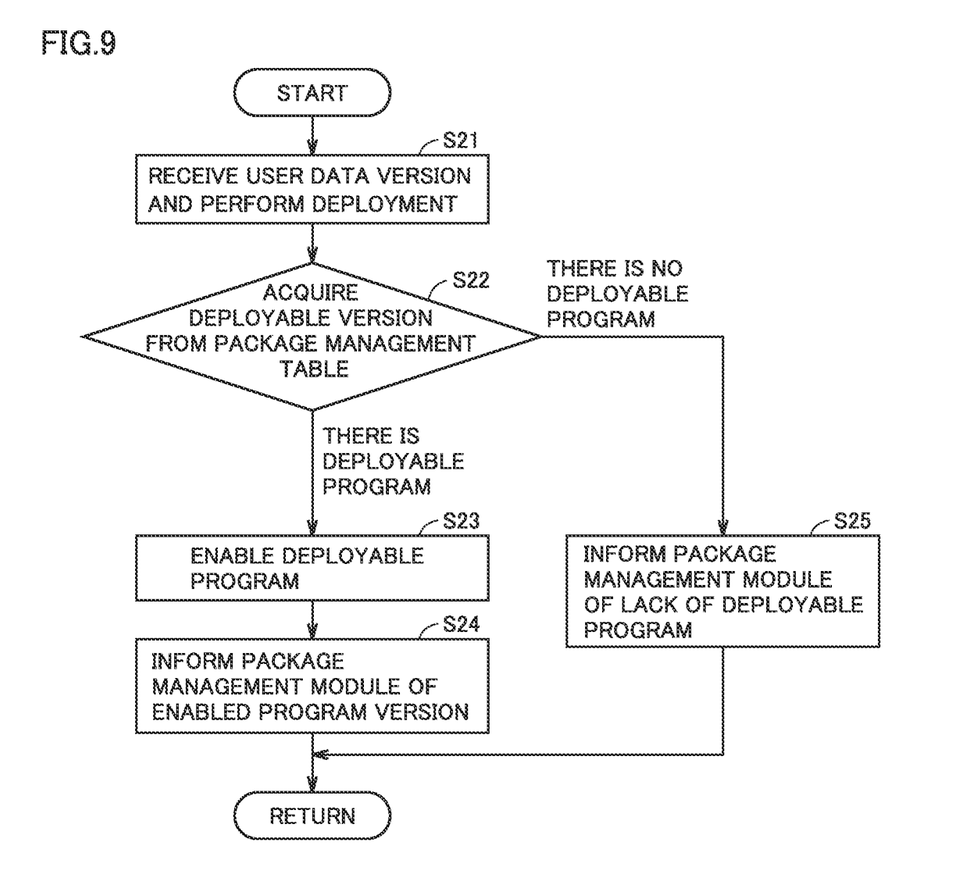
FIG. 9 is a flowchart showing a flow of processing performed by a check module in a package program.

FIG. 9 is a flowchart showing a flow of processing performed by a check module in a package program. When the process starts, in step S21, the check module receives a user data version from package management module 106A and starts a deployment process. In step S22, the check module acquires a version of a deployable program of each package from package management table 54. Here, when there is a deployable package program, the process proceeds to step S23, where the check module enables the deployable package program. Then, in step S24, the check module informs the package management module of the enabled package program version. When there is no deployable package program, on the other hand, the check module informs package management module 106A of the lack of deployable package program.

According to the present embodiment, the package management module only needs to select a required package. The check module, on the other hand, only needs to select an appropriate version of a program. Thus, the addition of a package can be flexibly handled.

In the embodiment described above, the check module is included in each package program. However, package management module 106A may include the check module.

G. Additional Aspects

As described above, the present embodiment includes a disclosure as listed below.

1. A control device (100) for controlling an object to be controlled, the control device comprising:
   a main storage device (108) configured to store a user program and one or more program packages (32A, 32B, 32C) in a nonvolatile manner, the one or more program packages each storing one or more versions of programs that are executed in cooperation with the user program;
   a main memory (106) configured to arrange the user program and the programs of the program packages (32A, 32B, 32C); and
   a processor (102) configured to execute software including a package management module (106A) that manages the program packages (32A, 32B, 32C), wherein
   the package management module (106A) is configured to perform a deployment process for selecting, from the one or more program packages (32A, 32B, 32C), a package to be deployed based on a version of the user program, and arranging, from the package to be deployed, a version of a program compatible with the version of the user program in the main memory (106).
2. The control device (100) according to 1, wherein
   the one or more program packages (32A, 32B, 32C) each include a check module (25A, 25B, 25C) configured to select, from the package to be deployed, the version of the program compatible with the version of the user program, and to arrange the selected program in the main memory (106), in accordance with the deployment process by the package management module (106A).
3. The control device (100) according to 2, wherein
   the main storage device (108) is configured to store model information about a model name of hardware of the control device (100), and
   the package management module (106A) is configured to acquire the model information from the main storage device (108), and to select, from the one or more program packages (32A, 32B, 32C), the package to be deployed based on the model information and the version of the user program.
4. The control device (100) according to 3, wherein
   the main storage device (108) is configured to store a package management table (54), the package management table storing the model information, and a version of a program associated with the model information in each of the one or more program packages (32A, 32B, 32C), and
   the check module (25A, 25B, 25C) is configured to acquire, based on the model information and information stored in the package management table (54), information about a version of a program of the package compatible with the version of the user program.
5. The control device (100) according to any one of 1 to 4, wherein
   the one or more program packages (32A, 32B, 32C) are a plurality of program packages,
   the plurality of program packages include an add-on package (32C) added on to the control device (100),
   the main storage device (108) is configured to store a table (60), the table storing the version of the user program and a version of each program of each of the plurality of program packages in association with each other, and
   the package management module (106A) is configured to determine, based on information stored in the table (60), whether or not a combination of the plurality of program packages including the add-on package (32C) is a combination compatible with the version of the user program, and when the combination of the plurality of program packages is the combination compatible with the version of the user program, to select a program of the add-on package (32C) having a version compatible with the version of the user program.
6. A method for deployment of software for use in a control device (100) that controls an object to be controlled, the control device (100) comprising
   a main storage device (108) configured to store a user program and one or more program packages (32A, 32B, 32C) in a nonvolatile manner, the one or more program packages each storing one or more versions of programs that are executed in cooperation with the user program,
   a main memory (106) configured to arrange the user program and the programs of the program packages (32A, 32B, 32C), and
   a processor (102) configured to execute the software, the method for deployment comprising:
   acquiring a version of the user program;
   selecting, from the one or more program packages (32A, 32B, 32C), a package to be deployed based on the version of the user program;
   selecting, from the package to be deployed, a version of a program compatible with the version of the user program; and
   arranging the selected program in the main memory (106).
7. The method for deployment of software according to 6, wherein
   the selecting the package to be deployed includes
      acquiring model information about a model name of hardware of the control device (100), the model information stored in the main storage device (108), and
      selecting, from the one or more program packages (32A, 32B, 32C), the package to be deployed based on the model information and the version of the user program.
8. The method for deployment of software according to 7, wherein
   the main storage device (108) is configured to store a package management table (54), the package management table storing the model information, and a version of a program associated with the model information in each of the one or more program packages (32A, 32B, 32C), and
   the selecting the version of the program compatible with the version of the user program includes acquiring version information based on the model information.
9. The method for deployment of software according to any one of 6 to 8, wherein
   the one or more program packages (32A, 32B, 32C) are a plurality of program packages,
   the plurality of program packages include an add-on package (32C) added on to the control device (100),
   the main storage device (108) is configured to store a table (60), the table storing the version of the user program and a version of each program of each of the plurality of program packages in association with each other, and
   the selecting, from the package to be deployed, the version of the program compatible with the version of the user program includes
      determining, based on information stored in the table (60), whether or not a combination of the plurality of program packages including the add-on package (32C) is a combination compatible with the version of the user program, and when the combination of the plurality of program packages is the combination compatible with the version of the user program, selecting a program of the add-on package (32C) having a version compatible with the version of the user program.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

1 control system; 2 field network; 6 higher-order network; 10 user program; 12 user data version information; 14 configuration data; 20A, 20B, 20C, 21A, 22A, 22B program; 25A, 25B, 25C check module; 30 user data; 32 package program; 32A, 32B, 32C package; 34 system program; 36 protocol stack; 38 device driver; 40 setting information; 50 model information; 52 model name information; 54 package management table; 60 package consistency table; 100 control device; 102, 202 processor; 104 chip set; 106 main memory; 106A package management module; 108 storage; 110 higher-order network controller; 112 USB controller; 114 memory card interface; 116 memory card; 120 internal bus controller; 122 I/O unit; 130 field network controller; 200 support device; 204 main storage device; 206 input unit; 208 output unit; 210 secondary storage device; 212 optical drive; 214 recording medium; 218 communication interface; 220 processor bus; 300 server device; 400 display device; 500 field device; 510 remote input/output (I/O) device; 520, 524 robot; 522, 526 robot controller; 540 544 servo driver; 542, 546 servomotor; 2104 support program; 2106 project; 2108 standard control source program; S1 to S24 step.

The invention claimed is:

1. A control device configured to control an object to be controlled, the control device comprising:
   a main storage device configured to store a user program and one or more program packages in a nonvolatile manner, the one or more program packages each storing one or more versions of programs that are executed in cooperation with the user program;
   a main memory configured to arrange the user program and the programs of the program packages; and
   a processor configured to execute software including a package management module that manages the program packages, wherein
   the package management module is configured to perform a deployment process for selecting, from the one or more program packages, a package to be deployed based on a version of the user program, and arranging, from the package to be deployed, a version of a program compatible with the version of the user program in the main memory,
   the one or more program packages each include a check module configured to select, from the package to be deployed, the version of the program compatible with the version of the user program, and to arrange the selected program in the main memory, in accordance with the deployment process by the package management module,
   the main storage device is configured to store model information about a model name of hardware of the control device, and
   the package management module is configured to acquire the model information from the main storage device, and to select, from the one or more program packages, the package to be deployed based on the model information and the version of the user program.

2. The control device according to claim 1, wherein
   the main storage device is configured to store a package management table, the package management table storing the model information, and a version of a program associated with the model information in each of the one or more program packages, and
   the check module is configured to acquire, based on the model information and information stored in the package management table, information about a version of a program of the package compatible with the version of the user program.

3. The control device according to claim 1, wherein
   the one or more program packages are a plurality of program packages,
   the plurality of program packages include an add-on package added on to the control device,
   the main storage device is configured to store a table, the table storing the version of the user program and a version of each program of each of the plurality of program packages in association with each other, and
   the package management module is configured to determine, based on information stored in the table, whether or not a combination of the plurality of program packages including the add-on package is a combination compatible with the version of the user program, and when the combination of the plurality of program packages is the combination compatible with the version of the user program, to select a program of the add-on package having a version compatible with the version of the user program.

4. A method for deployment of software for use in a control device that controls an object to be controlled, the control device comprising
   a main storage device configured to store a user program and one or more program packages in a nonvolatile manner, the one or more program packages each storing one or more versions of programs that are executed in cooperation with the user program,
   a main memory configured to arrange the user program and the programs of the program packages, and
   a processor configured to execute the software comprising a package management module that manages the program packages,
   wherein the package management module is configured to perform a deployment process for selecting, from the one or more program packages, a package to be deployed based on a version of the user program, and arranging, from the package to be deployed, a version of a program compatible with the version of the user program in the main memory, and wherein the one or more program packages each include a check module configured to select, from the package to be deployed, the version of the program compatible with the version of the user program, and to arrange the selected program in the main memory, in accordance with the deployment process by the package management module, and
   wherein the method for deployment comprises:
   acquiring a version of the user program;

acquiring model information about a model name of hardware of the control device, the model information stored in the main storage device, selecting, from the one or more program packages, a package to be deployed based on the model information and the version of the user program;

selecting, from the package to be deployed, a version of a program compatible with the version of the user program; and arranging the selected program in the main memory.

5. The method for deployment of software according to claim 4, wherein the main storage device is configured to store a package management table, the package management table storing the model information, and a version of a program associated with the model information in each of the one or more program packages, and the selecting the version of the program compatible with the version of the user program includes acquiring version information based on the model information.

6. The method for deployment of software according to claim 4, wherein the one or more program packages are a plurality of program packages, the plurality of program packages include an add-on package added on to the control device, the main storage device is configured to store a table, the table storing the version of the user program and a version of each program of each of the plurality of program packages in association with each other, and the selecting, from the package to be deployed, the version of the program compatible with the version of the user program includes determining, based on information stored in the table, whether or not a combination of the plurality of program packages including the add-on package is a combination compatible with the version of the user program, and when the combination of the plurality of program packages is the combination compatible with the version of the user program, selecting a program of the add-on package having a version compatible with the version of the user program.

* * * * *